United States Patent [19]
Wycech et al.

[11] Patent Number: 6,092,864
[45] Date of Patent: Jul. 25, 2000

[54] OVEN CURED STRUCTURAL FOAM WITH DESIGNED-IN SAG POSITIONING

[75] Inventors: Joseph S Wycech, Grosse Pointe Woods; George F. Didlake, Troy, both of Mich.

[73] Assignee: Henkel Corporation, Gulph Mills, Pa.

[21] Appl. No.: 09/236,746

[22] Filed: Jan. 25, 1999

[51] Int. Cl.[7] .................................................. B60R 27/00
[52] U.S. Cl. ........................ 296/204; 296/187; 296/205; 52/731.6; 52/735.1
[58] Field of Search ................................ 296/146.6, 188, 296/189, 204, 187, 205; 293/120, 122; 52/731.1, 731.2, 731.6, 731.7, 735.1, 232

[56] References Cited

U.S. PATENT DOCUMENTS

| 4,019,301 | 4/1977 | Fox ........................ 52/721.4 |
| 4,751,249 | 6/1988 | Wycech .................... 521/54 |
| 4,836,516 | 6/1989 | Wycech .................... 267/279 |
| 4,853,270 | 8/1989 | Wycech .................... 428/68 |
| 4,861,097 | 8/1989 | Wycech .................... 296/188 |
| 4,923,902 | 5/1990 | Wycech .................... 521/54 |
| 4,978,562 | 12/1990 | Wycech .................... 428/35.8 |
| 5,124,186 | 6/1992 | Wycech .................... 428/35.8 |
| 5,575,526 | 11/1996 | Wycech .................... 296/205 |
| 5,755,486 | 5/1998 | Wycech .................... 296/188 |
| 5,884,960 | 3/1999 | Wycech .................... 296/146.6 |
| 5,888,600 | 3/1999 | Wycech .................... 428/35.9 |
| 6,003,274 | 12/1999 | Wycech .................... 52/232 |

FOREIGN PATENT DOCUMENTS 0 891 918 A1  1/1999  European Pat. Off. .
WO97/43501  11/1997  WIPO .

*Primary Examiner*—D. Glenn Dayoan
*Assistant Examiner*—Patricia L. Engle
*Attorney, Agent, or Firm*—Wayne C. Jaeschke; Stephen D. Harper; Harold Pezzner

[57] ABSTRACT

A laminate for reinforcing a structural member having a plurality of side walls comprises a carrier having at least one inclined support surface. Each support surface has an outer edge disposed toward a respective side wall. A layer of extruded uncured structural foam is on each support surface and terminates inwardly of the outer edge. The foam expands when cured and tumbles down the inclined support surface of the carrier to become bonded to the side wall as well as the carrier. By being spaced from the outer edge of the support surface, the tendency for the foam to wipe against the side wall is minimized as is the tendency for a worker to touch the foam when the worker places the carrier into the structural member.

23 Claims, 1 Drawing Sheet

OVEN CURED STRUCTURAL FOAM WITH DESIGNED-IN SAG POSITIONING

BACKGROUND OF THE INVENTION

Various applications such as in the automotive field utilize structural foam to reinforce members. One form of application that has been suggested is to place the foam between side walls of a structural member. The placement may be facilitated by having the foam on a carrier which is inserted between the side walls where the foam is a heat expandable foam. The foam is initially bonded to the carrier and upon curing then becomes bonded to the structural member walls. In such approaches the foam is generally spread on the carrier in what would generally correspond to the final location where the foam would be in contact with the walls of the structural member so that upon curing there is assurance that the foam will contact the side walls and become intimately bonded to the side walls. With this technique, however, the foam may wipe against the side walls as it is being placed into the structural member. A further consideration with this technique is that the tacky foam may also contact the worker in, for example, an assembly line where the worker would be placing the foam and its carrier into the structural member.

SUMMARY OF THE INVENTION

An object of this invention is to provide a structural foam design which minimizes the tendency of the foam to wipe against the structural member and to be touched by the worker when the foam is inserted in place.

A further object of this invention is to provide such a structural foam which would be placed on a carrier wherein the foam is shaped and dimensioned in such a manner as to accomplish these objects.

In a preferred practice of this invention the carrier has a plurality of support surfaces onto which a layer of the structural foam would be placed. Each layer of the foam terminates inwardly of the outer edge of the support surface. Thus, when the carrier is inserted into the structural member with the outer edge of each support surface located at the walls of the structural member, the foam is spaced inwardly from the walls of the structural member thus minimizing any tendency for the foam to wipe against the walls while being inserted into the desired location. The carrier also includes sufficient portions free of the foam to function as a handle so that the worker may insert the carrier in place and minimize any tendency to touch the foam.

Preferably, the foam is expandable upon curing so that upon expansion the foam moves into contact with the side walls to be intimately bonded to the carrier and the side walls. In the preferred practice of this invention the foam is thermally expandable. This has the advantage in vehicle assembly lines of utilizing a conventional oven for the assembly line to cure the foam.

In a preferred practice of the invention the foam is extruded in block form and mounted on the support surface of the carrier. The carrier may generally be of I-beam shape having sloping walls which function as a pair of support surfaces. Where the foam is placed on each sloping wall the foam may be undercut to facilitate the foam moving downwardly and outwardly into contact with the structural member wall under the effects of gravity and the soft nature of the oven heated extrusion.

THE DRAWINGS

DETAILED DESCRIPTION

The present invention is based upon the utilization of a structural foam such as TERACORE® to reinforce structural members. A particular utility of the invention is as a reinforcement for vehicle parts and more particularly where the foam is inserted into a hollow structural member between the walls of the member as part of the assembly line.

In accordance with the invention the structural foam is a polymer which expands upon curing. Preferably, the polymer foam is a heat or thermally expandable foam such as described in U.S. Pat. No. 5,575,526, all of the details of which are incorporated herein by reference thereto. The advantage of a heat expandable foam particularly in connection with a vehicle beam or vehicle part is that the foam would expand when the portion of the vehicle including the structural member or beam would be subjected to heat in an oven such as by the conventional coating processes used in vehicle manufacturing. Thus, a separate heating step is not needed to expand the foam.

While a heat expandable foam is preferred, it is to be understood that the invention may be practiced with other types of foams which are, for example, chemically activated. Thus, any suitable expandable foam material or resin foam may be used in the broad practice of this invention.

Figure 1:
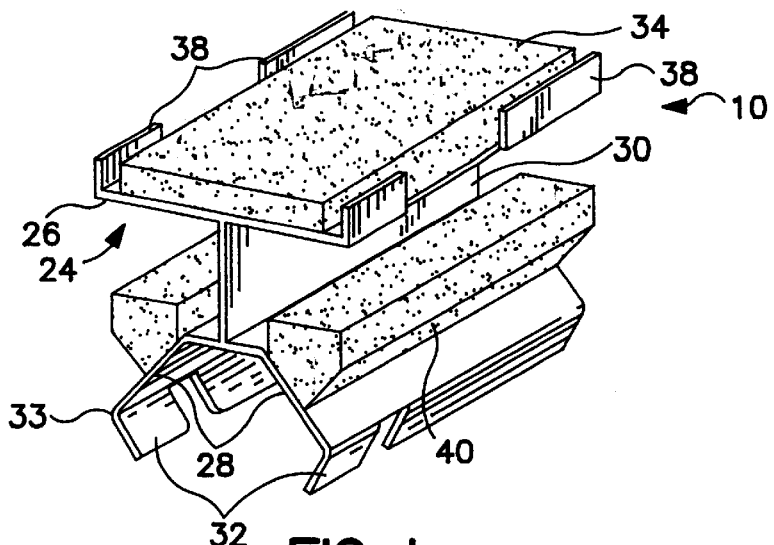
FIG. 1 is a perspective view of a laminate or drop in insert comprising a carrier and foam in accordance with this invention.
Figure 2:
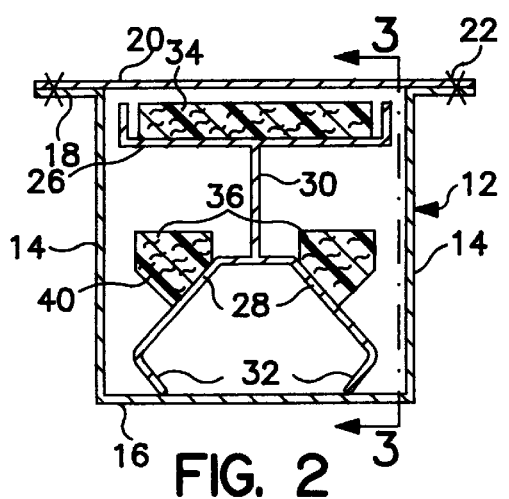
FIG. 2 is a cross sectional elevational view showing the laminate of FIG. 1 mounted in a structural member.
Figure 3:
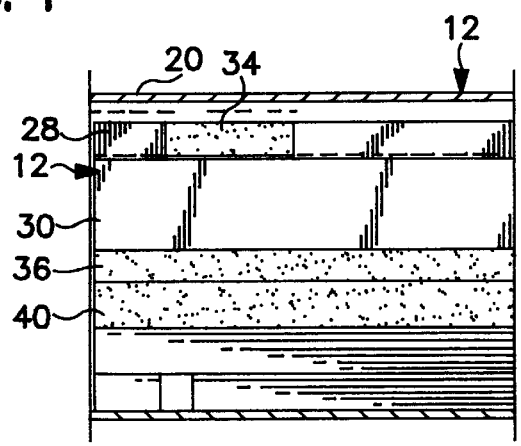
FIG. 3 is a cross-sectional view taken through FIG. 2 along the line 3—3.

FIG. 1 illustrates a drop in insert or laminate 10 particularly designed to reinforce the rail section of a vehicle. Thus, as shown in FIG. 2 the rail section 12 is of generally U-shape with a pair of spaced side walls 14,14 interconnected by a bottom wall 16. Rail section 12 is made of a metal material. The walls 14 have outwardly extending flanges 18 upon which the floor pan 20 is seated to cover the hollow rail section. Floor pan 20 is secured to rail section 12 by known securing structure generally indicated by the reference numeral 22.

Laminate 10 is in the form of a generally I-beam type carrier 24 having a generally horizontal upper support surface 26 and inclined support surfaces 28 connected to upper support surface 26 by web 30. The inclined support surfaces 28 bend at shoulders 33 to terminate in ends or legs 32 which would rest upon bottom or floor 16 of rail section 12.

As best shown in FIGS. 1–2 a block of foam 34 is extruded on upper support surface 26 while blocks of foam 36 are extruded on inclined support surfaces 28.

As also shown in FIGS. 1–2 each layer or block of foam 34,36 terminates inwardly of the outer edge of its respective support surface. Thus, a spacing is shown between the side walls of foam block 34 and the upstanding side walls 38 of upper support surface 26. Similarly, foam blocks 36 terminate at a location spaced from the legs or ends 32 of inclined support surfaces 28. In a preferred practice of this invention each foam block 36 has an undercut 40 for purposes which will be later described.

Because the foam blocks are placed at isolated portions of carrier 24, carrier 24 includes a number of locations free of any foam resin, as is clearly illustrated. These locations may be used by an assembly worker as a handle to drop the laminate or insert 10 into the hollow rail 12 without having the foam wipe against the side walls 14,14 and avoiding or at least minimizing the likelihood that the worker will touch the tacky foam material.

After the laminate 10 is inserted in the rail 12 the rail continues on its assembly line and at a subsequent location the floor pan 20 is mounted to the rail. During a subsequent assembly step the rail is placed in an oven where the one part foam extrusion 34,36 becomes cured and expands outwardly to the condition shown in FIG. 4. As shown therein the upper foam block 34 expands into intimate contact with floor pan 20, thus, not only functioning as a rigid reinforcement, but also bonding the floor pan 20 to the carrier 24 which in turn becomes bonded to the side walls 14 of rail 12 by the expanded foam blocks 36,36.

While in the paint oven the extrusions 34,36 will soften. Extrusions 36,36 will roll outboard or laterally outwardly because of the slope of carrier support surfaces 28 and the undercut 40 of each extrusion 36. In addition, the affects of gravity and the soft nature of the oven heated extrusion 36 help to cause the extrusion 36 to find its final design position where it seats, expands and cures as shown in FIG. 4.

Figure 4:
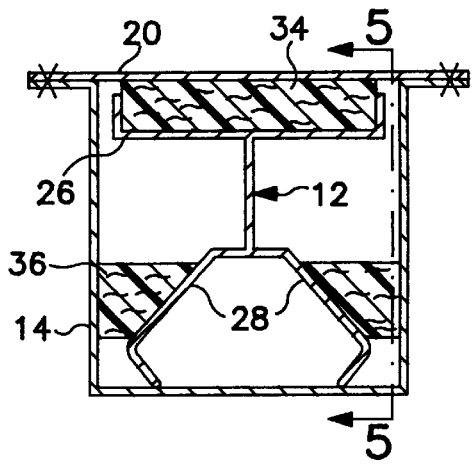
FIG. 4 is a view similar to FIG. 2 after the foam has expanded and then cured.
Figure 5:
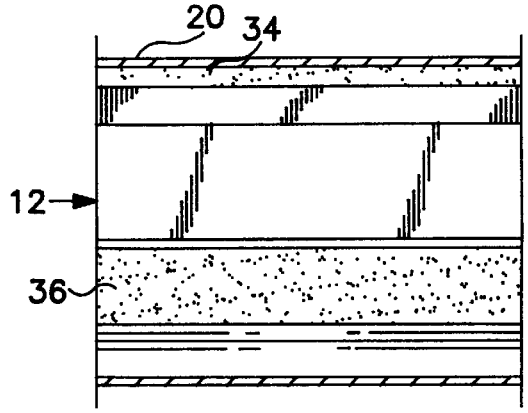
FIG. 5 is a cross-sectional view taken through FIG. 4 along the line 5—5.

As illustrated in FIGS. 1, 2 and 4 the bend 33 between the sloping surface 28 and the leg 32 is thus disposed generally at a respective side wall 14. When the foam softens and rolls downwardly on the sloping surfaces 28 the distance that bend 33 is spaced from side wall 14 is sufficiently small that the foam bridges the gap to thereby heat, expand and cure into intimate contact with the side wall.

While the invention has been particularly illustrated and described with respect to a vehicle rail section made of metal and a metal carrier, it is to be understood that the invention may be practiced with any type of structural member which is intended to be reinforced by a structural foam. In particular, the invention may be practiced with a structural member which is hollow and thus has spaced walls. The illustrated carrier 24 is shown as having a support surface for each of the spaced walls. It is to be understood, however, that in a broad practice of the invention the carrier may include only one foam extrusion for intimate contact with only one wall or surface of a structural member. Similarly, while the invention may be practiced with various types of structural members, the invention may also be practiced using materials other than metal for the structural member and carrier. Preferably, the materials should be selected so that there is an effective bonding of the expanded foam with the carrier and the structural member. Thus, the carrier and/or the structural member could be made of various plastics or polymeric materials or various wood type fibrous materials having sufficient rigidity for the carrier to function as a support for the polymer layer or foam, and for the structural member to have sufficient rigidity to achieve its intended functions. Where the foam is a heat expandable foam, the carrier should be able to withstand high temperatures. If the foam is chemically cured instead of heat cured then the basic requirement for the carrier is that it has sufficient rigidity to function in its intended manner, but it would not be required to be able to withstand high temperatures. Preferably, the carrier is sufficient shape retaining to assure that it can be properly placed in the structural member with the foam spaced from the walls of the structural member.

It is also to be understood that while the invention has particular utility in the automotive or vehicle fields, the invention may be practiced in other fields where, for example, it is necessary to reinforce a beam and particularly desirable that such reinforcement be accomplished by a structural foam so as to reduce the cost and weight while still achieving the desired rigidity.

The invention thus provides a laminate which makes it possible to locate the tacky foam as a one part extrusion such that the foam does not come into contact with the metal section or walls that it reinforces as the foam is placed in its intended location. Thus, the invention avoids the likelihood that the foam will wipe against the rail or walls of the structural member. An additional advantage is that the worker may manually place the foam as a drop in insert into the structural member while minimizing personal or direct contact with the foam.

What is claimed is:

1. A laminate for reinforcing a structural member having a plurality of spaced side walls comprising a carrier, said carrier having at least one support surface, said support surface having an outer edge for being generally disposed at a respective one of the side walls of the structural member, a layer of uncured structural foam on said support surface, said layer of said foam terminating inwardly of said outer edge of said support surface, said foam being made of a polymer material which is expandable when being cured for expanding to said outer edge and thereby bonding to the side wall of the structural member, and portions of said carrier being free of said foam and accessible to function as a handle whereby a worker may place said carrier between the spaced side walls of the structural member and minimize the touching of said foam by the worker.

2. The laminate of claim 1 wherein said support surface is a sloping surface.

3. The laminate of claim 2 wherein said foam is a block of foam having an undercut to facilitate said foam rolling downwardly and laterally outwardly under the affect of gravity to a location of final seating and expansion and curing.

4. The laminate of claim 3 wherein said foam is heat curable.

5. The laminate of claim 4 wherein there are two of said sloping support surfaces oppositely disposed from each other, and an extruded block of said foam being on each of said sloping support surfaces.

6. The laminate of claim 5 wherein said carrier includes an upper support surface, and a block of said foam being on said upper support surface.

7. The laminate of claim 6 in combination with a structural member, said structural member having a plurality of spaced side walls, said carrier being located in said structural member between said side walls, and said foam being expanded into intimate bonding with a respective said side wall upon the curing of said foam.

8. The laminate of claim 7 wherein said structural member is an automotive rail having a bottom wall interconnecting said side walls, said carrier having legs mounted on said bottom wall, and a respective one of said foam blocks being located at each of said side walls.

9. The laminate of claim 8 wherein said carrier is generally in the form of an I-beam having an upper wall and a lower wall, said upper wall comprising said upper support surface and said lower wall being bent into said sloping surfaces.

10. The laminate of claim 9 wherein said lower wall terminates in inwardly bent legs extending from a junction with said outwardly sloping surfaces.

11. The laminate of claim 10 including a floor pan mounted over said rail, and said foam on said upper surface being expanded into intimate contact with said floor pan.

12. The laminate of claim 3 wherein there are two of said sloping support surfaces oppositely disposed from each other, and an extruded block of said foam being on each of said support sloping support surfaces.

13. The laminate of claim 12 wherein said carrier includes an upper support surface, and a block of said foam being on said upper support surface.

14. The laminate of claim 13 wherein said carrier is generally in the form of an I-beam having an upper wall and a lower wall, said upper wall comprising said upper support surface and said lower wall being bent into said sloping surfaces.

15. The laminate of claim 10 wherein said lower wall terminates in inwardly bent legs extending from a junction with said outwardly sloping surfaces.

16. The laminate of claim 1 in combination with a structural member, said structural member having a plurality of spaced side walls, said carrier being located in said structural member between said side walls, and said foam being expanded into intimate bonding with a respective said side wall upon the curing of said foam.

17. The laminate of claim 16 wherein said structural member is an automotive rail having a bottom wall interconnecting said side walls, said carrier having legs mounted on said bottom wall, and a respective one of said foam blocks being located at each of said side walls.

18. A method of reinforcing a structural member having a plurality of spaced side walls comprising the steps of providing a carrier having a support surface with an outer edge, mounting a block of uncured structural foam on the support surface with the foam terminating inwardly of the outer edge, the carrier comprising a drop in insert, placing the drop in insert into the structural member with the outer edge of the support surface generally located at one of the side walls of the structural member to thereby minimize any tendency of the foam to wipe against the side wall when the insert is placed into the structural member, a worker placing the insert into the structural member by holding a portion of the carrier which is free of the foam to minimize any tendency for direct touching of the foam, and curing the foam to expand the foam into an intimate bond with the side wall.

19. The method of claim 18 wherein the foam is an extruded block having an undercut, and causing the foam during cure to roll downwardly and outwardly on the support surface at the undercut.

20. The method of claim 19 wherein the carrier includes a pair of sloping support surfaces, each of said sloping support surfaces being disposed toward a respective wall of the structural member, and intimately bonding each of the blocks of the structural foam to its respective wall upon expansion of the foam.

21. The method of claim 20 wherein the structural member is an automotive beam, and the foam is heat curable, and curing the foam while the beam is in a paint oven.

22. The method of claim 21 wherein the beam is a rail, and including the step of mounting a floor pan over the rail after the drop in insert has been placed in the rail.

23. The method of claim 22 wherein the carrier includes an upper support surface disposed toward the rail, mounting a block of the foam on the upper support surface, and intimately bonding the upper block of foam on the upper support surface to the underside of the floor pan.

* * * * *